(12) United States Patent
Smith et al.

(10) Patent No.: US 10,309,345 B2
(45) Date of Patent: Jun. 4, 2019

(54) VALVE CONTROLLER FOR PRESSURE STABILIZATION

(71) Applicant: THE BOEING COMPANY, Chicago, IL (US)

(72) Inventors: Gregory H. Smith, Placentia, CA (US); Julio C. Martinez, Anaheim, CA (US); Fernando C. Teran, Placentia, CA (US); Romeo Andrade Reyes, Diamond Bar, CA (US); B. Wayne Pauley, Seal Beach, CA (US); Randall W. Watkins, Chino Hills, CA (US)

(73) Assignee: THE BOEING COMPANY, Chicago, IL (US)

( * ) Notice: Subject to any disclaimer, the term of this patent is extended or adjusted under 35 U.S.C. 154(b) by 6 days.

(21) Appl. No.: 15/594,063

(22) Filed: May 12, 2017

(65) Prior Publication Data

US 2017/0248101 A1    Aug. 31, 2017

Related U.S. Application Data

(62) Division of application No. 14/657,799, filed on Mar. 13, 2015, now Pat. No. 9,650,996.

(51) Int. Cl.
| | |
|---|---|
| *F02K 9/50* | (2006.01) |
| *F02K 9/52* | (2006.01) |
| *B64G 1/60* | (2006.01) |
| *B64G 1/40* | (2006.01) |

(Continued)

(52) U.S. Cl.
CPC ............. *F02K 9/566* (2013.01); *B64G 1/402* (2013.01); *B64G 1/60* (2013.01); *F02K 9/50* (2013.01); *F02K 9/56* (2013.01); *F02K 9/605* (2013.01); *F05D 2220/80* (2013.01); *F05D 2270/051* (2013.01); *F05D 2270/301* (2013.01)

(58) Field of Classification Search
CPC .... F16J 12/00; F02K 9/00; F17C 1/00; B64G 1/00; B64G 1/40; F16K 3/00; F16K 39/00; F04B 13/00; F04B 49/00; F04B 49/022

See application file for complete search history.

(56) References Cited

U.S. PATENT DOCUMENTS

| | | | |
|---|---|---|---|
| 3,229,463 A | 1/1966 | Dryden | |
| 4,550,888 A * | 11/1985 | Douglass | ............. F42B 10/663 244/169 |
| 5,954,089 A | 9/1999 | Seymour | |

(Continued)

OTHER PUBLICATIONS

U.S. Appl. No. 13/072,079, entitled Squib Initiation Sequencer, filed Mar. 25, 2011.
European Search Report for EP 16154840.9, dated Jul. 21, 2016.

*Primary Examiner* — Yonel Beaulieu
(74) *Attorney, Agent, or Firm* — Patterson + Sheridan, LLP (57) ABSTRACT

Method and apparatus for controlling pressure in a pressure vessel. A plurality of valves between a pressure source and a pressure vessel can be selectively opened or turned off, singularly or in combinations, to control pressure in the pressure vessel. A maximum pressure threshold and a minimum pressure threshold can be established based on operating considerations of the pressure vessel. One or more of the valves can be turned on when the pressure in the pressure vessel reaches the minimum pressure threshold. One or more of the valves can be turned off when the pressure in the pressure vessel reaches the maximum pressure threshold.

16 Claims, 5 Drawing Sheets

(51) Int. Cl.
*F02K 9/56* (2006.01)
*F02K 9/60* (2006.01)

(56) References Cited

U.S. PATENT DOCUMENTS

| | | | |
|---|---|---|---|
| 6,113,032 A | 9/2000 | Cochran et al. | |
| 6,267,326 B1 | 7/2001 | Smith et al. | |
| 6,314,978 B1 * | 11/2001 | Lanning | B64G 1/402 |
| | | | 137/1 |
| 7,082,750 B2 * | 8/2006 | Knight | F02K 9/50 |
| | | | 417/393 |
| 7,257,940 B1 * | 8/2007 | Knight | F02K 9/50 |
| | | | 60/257 |
| 7,286,333 B2 | 10/2007 | Kubinski et al. | |
| 7,578,481 B2 | 8/2009 | Smith et al. | |
| 7,716,912 B2 * | 5/2010 | Cover | F02K 9/08 |
| | | | 239/265.25 |
| 7,779,628 B2 * | 8/2010 | Petre | B60K 6/12 |
| | | | 60/413 |
| 8,196,481 B2 | 6/2012 | Peukert et al. | |
| 8,291,691 B2 * | 10/2012 | Spear | F02K 9/28 |
| | | | 60/229 |
| 8,826,688 B2 * | 9/2014 | Tachibana | A23L 2/54 |
| | | | 137/599.09 |
| 8,950,195 B2 * | 2/2015 | Watts | F17C 5/06 |
| | | | 62/48.2 |
| 9,151,245 B2 * | 10/2015 | Kawadu | F02K 9/08 |
| 9,194,332 B2 * | 11/2015 | Caubet | B64G 1/26 |
| 9,365,300 B2 * | 6/2016 | Fujita | B64G 1/26 |
| 9,631,611 B2 * | 4/2017 | Magoon | F04B 13/00 |
| 2008/0264498 A1 * | 10/2008 | Thompson | F16K 3/246 |
| | | | 137/554 |
| 2009/0085612 A1 | 4/2009 | Smith et al. | |
| 2011/0277446 A1 * | 11/2011 | Stroud | F02K 9/08 |
| | | | 60/204 |
| 2013/0097995 A1 * | 4/2013 | Schroeder | F02K 9/94 |
| | | | 60/219 |

* cited by examiner

VALVE CONTROLLER FOR PRESSURE STABILIZATION

CROSS-REFERENCE TO RELATED APPLICATIONS

This application is a divisional of U.S. patent application Ser. No. 14/657,799, filed Mar. 13, 2015, now issued as U.S. Pat. No. 9,650,996. The aforementioned related patent application is herein incorporated by reference in its entirety.

BACKGROUND

Aspects described herein relate to regulating pressure, and more specifically, to a controller for regulating pressure.

SUMMARY

According to one aspect, a method for regulating pressure in a pressure vessel connected to a pressure source by a plurality of valves includes receiving a maximum pressure threshold value. The method also includes receiving a minimum pressure threshold value. The method also includes receiving a pressure signal indicating a pressure in the pressure vessel. The method also includes, upon a value of the pressure signal dropping below the minimum pressure threshold value, opening at least one of the plurality of valves. The method also includes, upon a value of the pressure signal rising above the maximum pressure threshold level, closing at least one of the plurality of valves.

According to one aspect, an apparatus for controlling pressure in a pressure vessel, wherein the pressure vessel is connected to a pressure source by a plurality of valves, and wherein the pressure vessel includes one or more pressure sensors that measure pressure within the pressure vessel, the apparatus including a sensor input configured to receive analog pressure signals from the one or more pressure sensors. The apparatus also includes a high-threshold input that receives a high-pressure limit signal. The apparatus also includes a low-threshold input that receives a low-pressure limit signal. The apparatus also includes a valve controller. The valve controller is configured to compare the one or more digital pressure signals to the high-pressure limit signal and the low-pressure limit signal. The valve controller is also configured to output a first valve driver signal that causes at least one of the plurality of valves to open upon the one or more digital pressure signals dropping below the low-pressure limit signal. The valve controller is also configured to output a second valve driver signal that causes at least one of the plurality of valves to close upon the one or more digital pressure signals rising above the high-pressure limit signal.

According to one aspect, a vehicle includes an engine and a pressurized fuel storage tank. The vehicle also includes a pressure sensor in the pressurized fuel storage tank configured to output pressure signals. The vehicle also includes a pressure source for the pressurized fuel storage tank. The vehicle also includes a plurality of selectively controllable valves between the pressurized fuel storage tank and the pressure source. The vehicle also includes a flight management computer configured to control operation of the engine, wherein the flight management computer outputs a high pressure limit signal and a low pressure limit signal. The vehicle also includes a valve controller. The valve controller includes a pressure input configured to receive the output pressure signals from the pressure sensor. The valve controller also includes a high pressure threshold input configured to receive the high-pressure limit signal. The valve controller also includes a low pressure threshold input configured to receive the low-pressure limit signal. The valve controller also includes at least one output in communication with the plurality of selectively controllable valves. The valve controller also includes a processor. The processor is configured to compare the pressure signals to the high pressure limit signal and the low pressure threshold signal. The processor is also configured to output a first valve driver signal to the plurality of selectively controllable valves upon the pressure signals dropping below the low-pressure limit signal, wherein the first valve driver signal causes at least one of the plurality of selectively controllable valves to open. The processor is also configured to output a second valve driver signal to the plurality of selectively controllable valves upon the pressure signals rising above the high-pressure limit signal, wherein the second valve driver signal causes at least one of the plurality of selectively controllable valves to close.

DETAILED DESCRIPTION

In the following, reference is made to aspects presented in this disclosure. However, the scope of the present disclosure is not limited to specific described aspects. Instead, any combination of the following features and elements, whether related to different aspects or not, is contemplated to implement and practice contemplated aspects. Furthermore, although aspects disclosed herein may achieve advantages over other possible solutions or over the prior art, whether or not a particular advantage is achieved by a given aspect is not limiting of the scope of the present disclosure. Thus, the following aspects, features, and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Figure 1:
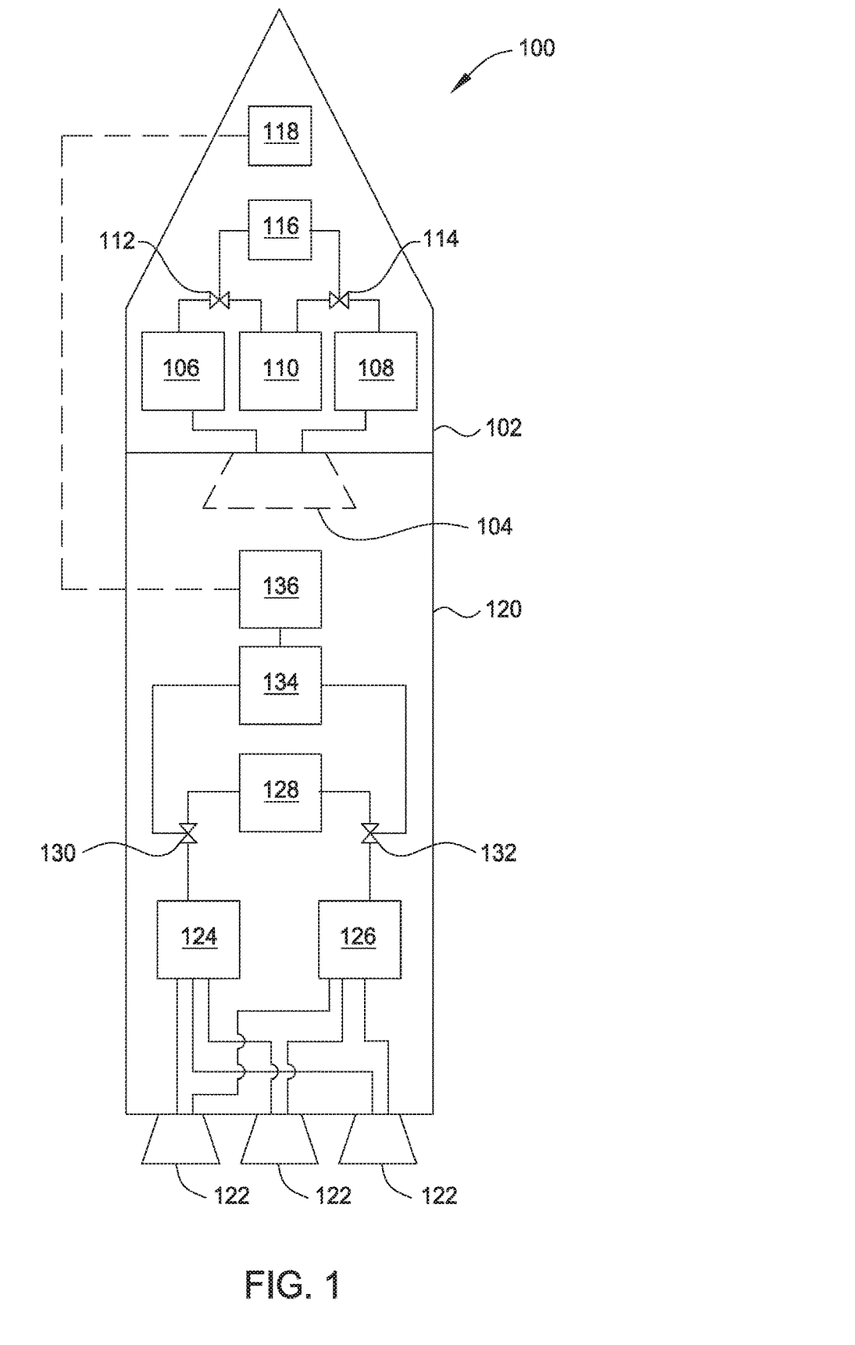
FIG. 1 is a schematic diagram of a rocket with propellant tanks and a pressurization tank, wherein the rocket includes a crew escape module with separate propellant tanks and a pressurization tank.

FIG. 1 illustrates aspects in a rocket 100 (i.e., a spacecraft) that includes a crew escape module 102 and a main rocket body 120. The main rocket body 120 includes one or more engines 122. The engine(s) 122 are powered by a first propellant tank 124 and a second propellant tank 126. In various aspects, the first propellant tank 124 can store a different propellant (i.e., fuel) than the second propellant tank 126. In such aspects, the engine(s) 122 can mix the different fuels for combustion. In various other aspects, the first propellant tank 124 and the second propellant tank 126 can store the same propellant and can both supply the same propellant to the engine(s) 122. In various aspects, the main rocket body 120 could include a single propellant tank or three or more propellant tanks. The propellant is typically pumped to the engine(s) 122 from the first propellant tank 124 and the second propellant tank 126 by pumps (e.g., turbopumps). As propellant from the first propellant tank 124 and the second propellant tank 126 are pumped to the engine(s) 122, a vacuum can develop in the first propellant tank 124 and the second propellant tank 126. The vacuum can reduce the amount of propellant pumped by the pumps. As a result, the engine(s) 122 could lose thrust.

The first propellant tank 124 and the second propellant tank 126 are connected to a pressure tank 128. The pressure tank 128 can store a gas, such as helium, under pressure. As propellant is drained from the first propellant tank 124 and the second propellant tank 126, the propellant can be replaced by gas from the pressure tank 128 to prevent a vacuum from developing. A first valve 130 can be placed between the pressure tank 128 and the first propellant tank 124 and a second valve 132 can be placed between the pressure tank 128 and the second propellant tank 126. The first valve 130 and the second valve 132 can meter the flow of gas from the pressure tank 128 to the first propellant tank 124 and the second propellant tank 126, respectively. In various aspects, the first valve 130 and the second valve 132 can be two-position valves (e.g., valves that are either open or closed). In various aspects, the first valve 130 can include multiple valves that can operate individually or in unison. The second valve 132 can also include multiple valves that can operate individually or in unison.

The first valve 130 and the second valve 132 are controlled by a valve controller 134, described in greater detail below. In various aspects, the valve controller 134 is completely autonomous, meaning that it does not require communication with a computer onboard the main rocket (e.g., a flight management computer (FMC) 136) to operate the valves. In various other aspects, the valve controller 134 is mostly autonomous, but can receive certain commands and/or pressure requirement information from a computer onboard the main rocket body 120.

The crew escape module 102 can be arranged on top of the main rocket body 120. In the event of a failure of the main rocket body 120, the crew escape module 102 can fire one or more engines 104 that can separate the crew escape module 102 from the main rocket body 120 and move the crew escape module 102 to a safe altitude at which parachutes or the like can be deployed. The engine(s) 104 is powered by a first propellant tank 106 and a second propellant tank 108. In various aspects, the first propellant tank 106 can store a different propellant (i.e., fuel) than the second propellant tank 108. In such aspects, the engine(s) 104 can mix the different fuels for combustion. In various other aspects, the first propellant tank 106 and the second propellant tank 108 can store the same propellant and can both supply the same propellant to the engine(s) 104. In various aspects, the crew escape module 102 could include a single propellant tank or three or more propellant tanks. The propellant is typically pumped to the engine(s) 104 from the first propellant tank 106 and the second propellant tank 108 by pumps (e.g., turbopumps). As propellant from the first propellant tank 106 and the second propellant tank 108 are pumped to the engine(s) 104, a vacuum can develop in the first propellant tank 106 and the second propellant tank 108. The vacuum can reduce the amount of propellant pumped by the pumps. As a result, the engine(s) 104 could lose thrust.

The first propellant tank 106 and the second propellant tank 108 can be connected to a pressure tank 110. The pressure tank 110 can store a gas, such as helium, under pressure. As propellant is drained from the first propellant tank 106 and the second propellant tank 108, the propellant can be replaced by gas from the pressure tank 110 to prevent a vacuum from developing. A first valve 112 can be placed between the pressure tank 110 and the first propellant tank 106 and a second valve 114 can be placed between the pressure tank 110 and the second propellant tank 108. The first valve 112 and the second valve 114 can meter the flow of gas from the pressure tank 110 to the first propellant tank 106 and the second propellant tank 108, respectively. In various aspects, the first valve 112 and the second valve 114 can be two-position valves (e.g., valves that are either open or closed). In various aspects, the first valve 112 can include multiple valves that can operate individually or in unison. The second valve 114 can also include multiple valves that can operate individually or in unison.

The first valve 112 and the second valve 114 can be controlled by a valve controller 116, described in greater detail below. In various aspects, the valve controller 116 is completely autonomous, meaning that it does not require communication with a computer onboard the main rocket (e.g., a flight management computer (FMC) 118) to operate the valves. In various other aspects, the valve controller 116 is mostly autonomous, but can receive certain commands and/or pressure requirement information from a computer onboard the crew escape module 102.

For illustration purposes, both the main rocket body 120 and the crew escape module 102 of the rocket 100 include a similar propulsion layout. In various aspects, the crew escape module 102 or the main rocket body 120 could use a different propulsion layout.

Figure 2:
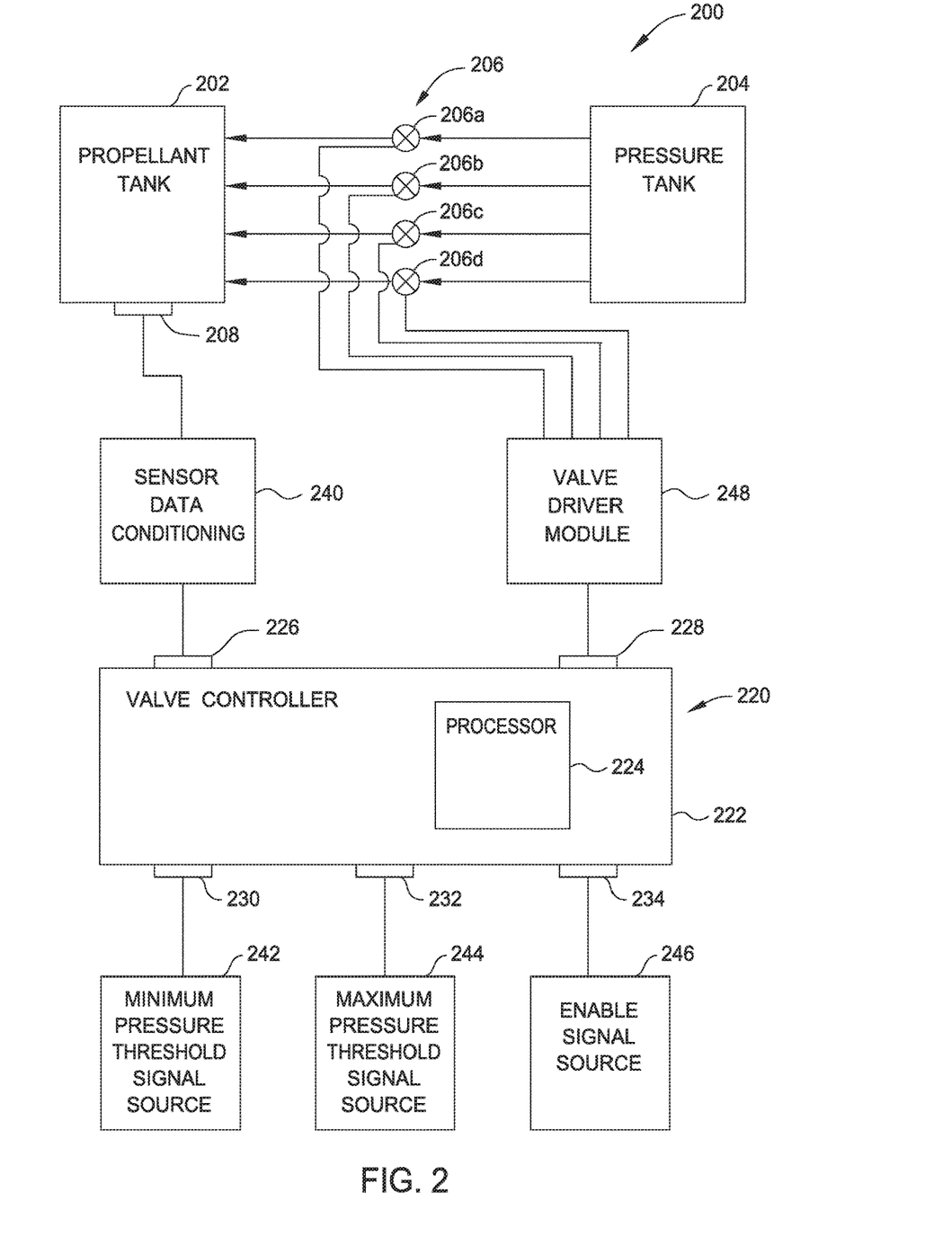
FIG. 2 is a schematic diagram of a valve arrangement for controlling flow of helium from a helium pressurization tank to a propellant tank and of a controller arrangement for controlling operation of the valve arrangement.

FIG. 2 illustrates an arrangement of valves 206 between a pressure tank 204 and a propellant tank 202. The valves 206 include four valves arranged in parallel between the pressure tank 204 and the propellant tank 202. In various aspects, the valves 206 can be actuated at the same time. For example, multiple valves may be necessary to achieve a desired flow area through the valves. In that case, the multiple valves can be actuated simultaneously to effectively act as one large valve. In certain aspects, a first valve 206a can be turned on (i.e., opened) if the pressure within the propellant tank 202 drops below a threshold level. If the pressure within the propellant tank 202 remains below the threshold level, a second valve 206b could be turned on. Additional valves 206c and 206d can be turned on if the pressure in the propellant tank 202 remains below the threshold level. In certain aspects, described in greater detail below, different numbers and/or combinations of valves 206a, 206b, 206c, and 206d could be turned on to achieve a desired rate of change of pressure in the propellant tank 202. Referring again to FIG. 1, each of the valves 112, 114, 130, and 132 can include multiple valves like that shown in FIG. 2.

FIG. 2 also illustrates a valve controller 220 according to various aspects for controlling the valves 206 according to various aspects. The valve controller 220 can include a processor 224, such as a field programmable gate array (FPGA) processor. The valve controller 220 can be a stand-alone unit (e.g., that can be used to test a valve system 206) or can be incorporated into a vehicle, such as the rocket 100 shown in FIG. 1. The valve controller 220 includes a first input 230 (i.e., a maximum pressure threshold input) that can receive a minimum pressure threshold value signal for the propellant tank 202. The valve controller 220 can also include a second input 232 (i.e., a minimum pressure threshold input) that can receive a maximum pressure threshold value signal for the propellant tank 202. In various aspects in which the valve controller 220 is a stand-alone unit, the minimum pressure threshold value signal and the maximum pressure threshold value signal can be provided by switches (e.g., hex switches) arranged on a housing for the valve controller 220. In various aspects in which the valve controller 220 is incorporated into a vehicle, the maximum pressure threshold value signal and the minimum pressure threshold value signal can be provided by an FMC (e.g., FMC 118 or FMC 136). If the performance of the engine(s) (e.g., engine(s) 104 or engine(s) 122) is not acceptable (e.g., if the engine is not producing sufficient thrust or the thrust specific fuel consumption is not sufficient), the FMC could determine that the pressure in the propellant tank 202 is not high enough. As a result, the FMC could increase the maximum pressure threshold value signal and/or the minimum pressure threshold value signal. In various aspects in which the valve controller 220 is incorporated into a vehicle, the maximum pressure threshold value signal and the minimum pressure threshold value signal could be provided by switches in a cockpit of the vehicle that can be adjusted by a pilot, engineer, or other operator on board the vehicle.

The valve controller 220 also includes a third input 234 that can receive an enable signal. The third input 234 can be connected to an enable signal module 246 that can provide the enable signal to the valve controller 220. In various aspects in which the controller 200 is a standalone unit, the enable signal module 246 can be a physical switch (e.g., a toggle switch) arranged on a housing 222 of the valve controller 220. In various aspects in which the controller 220 is incorporated in a vehicle, the enable signal module 246 could be a vehicle management computer. For example, as described above, the valve controller 220 could be used to control valves for a crew escape module (e.g., crew escape module 102) that is used in the event of a failure of a main rocket (e.g., main rocket body 120). In the event the crew escape module is to be used, an FMC (e.g., FMC 136) on board the main rocket body 120 could send a signal to the FMC 118 of the crew escape module 102. The FMC 118 of the crew escape module 102 could, in turn, send the enable signal to the valve controller 220. Alternatively, the FMC 136 onboard the main rocket body 120 could send the enable signal to the valve controller 220.

The valve controller 220 can include a fourth input 226 that receives pressure signals from one or more pressure sensors 208 that are arranged in the propellant tank 202. In various embodiments, a sensor data signal conditioning module 240 can be arranged between the pressure sensor(s) 208 and the valve controller 220. The sensor data signal conditioning module 240 can provide power to the pressure sensor(s) 208. The sensor data signal conditioning module 240 can supply different voltages for different types of pressure sensors. For example, certain pressure sensors require a 10 volt power supply. As another example, certain pressure sensors require a 28 volt power supply. Other pressure sensors may require different voltages. In various aspects, the sensor data signal conditioning module 240 could selectively supply a first voltage or a second voltage. In various aspects, the sensor data signal conditioning module 240 could supply a first voltage to a first sensor and supply a second voltage to a second sensor. The sensor data signal conditioning module 240 can also provide filtering (e.g., RC filtering) of pressure signals received from the sensor(s) 208. In various aspects in which there are at least two sensors 208, the sensor data signal conditioning module 240 can perform multiplexing on the signals from the multiple sensors 208. The sensor data signal conditioning module 240 can also include amplifiers that amplify the signals from the pressure sensor(s) 208. The sensor data signal conditioning module 240 can also include an analog-to-digital converter (ADC) that converts analog signals from the pressure sensor(s) 208 into digital signals. The sensor data signal conditioning module 240 can also include a transceiver that can transmit the conditioned pressure signals from the pressure sensor(s) 208 to the valve controller 220. In various aspects, the sensor data signal conditioning module 240 can be incorporated into the valve controller 220.

The valve controller 220 can include an output 228 that can transmit valve control commands to the valves 206. In various aspects, a valve driver module 248 can be arranged between the output 228 of the valve controller 220 and the valves 206. The valve driver module 248 can provide specific signals required for operation of certain valves. For example, in various instances, the valves 206 may by operated by solenoids. The solenoids may use a first level of current to actuate and a second level of current to remain actuated. The valve controller 220 can send a command to the valve driver module 248 to open or close a specific valve. The valve driver module 248, in turn, can output to the valves 206 the voltages and/or currents necessary to actuate the valves 206 in accordance with the commands from the valve controller 220. The valve controller 220 and the valve driver module 248 can actuate the valves 206a, 206b, 206c, and 206d individually, simultaneously, or in combinations. In various aspects, the valve driver module 248 could be incorporated into the valve controller 220.

Figure 3A:
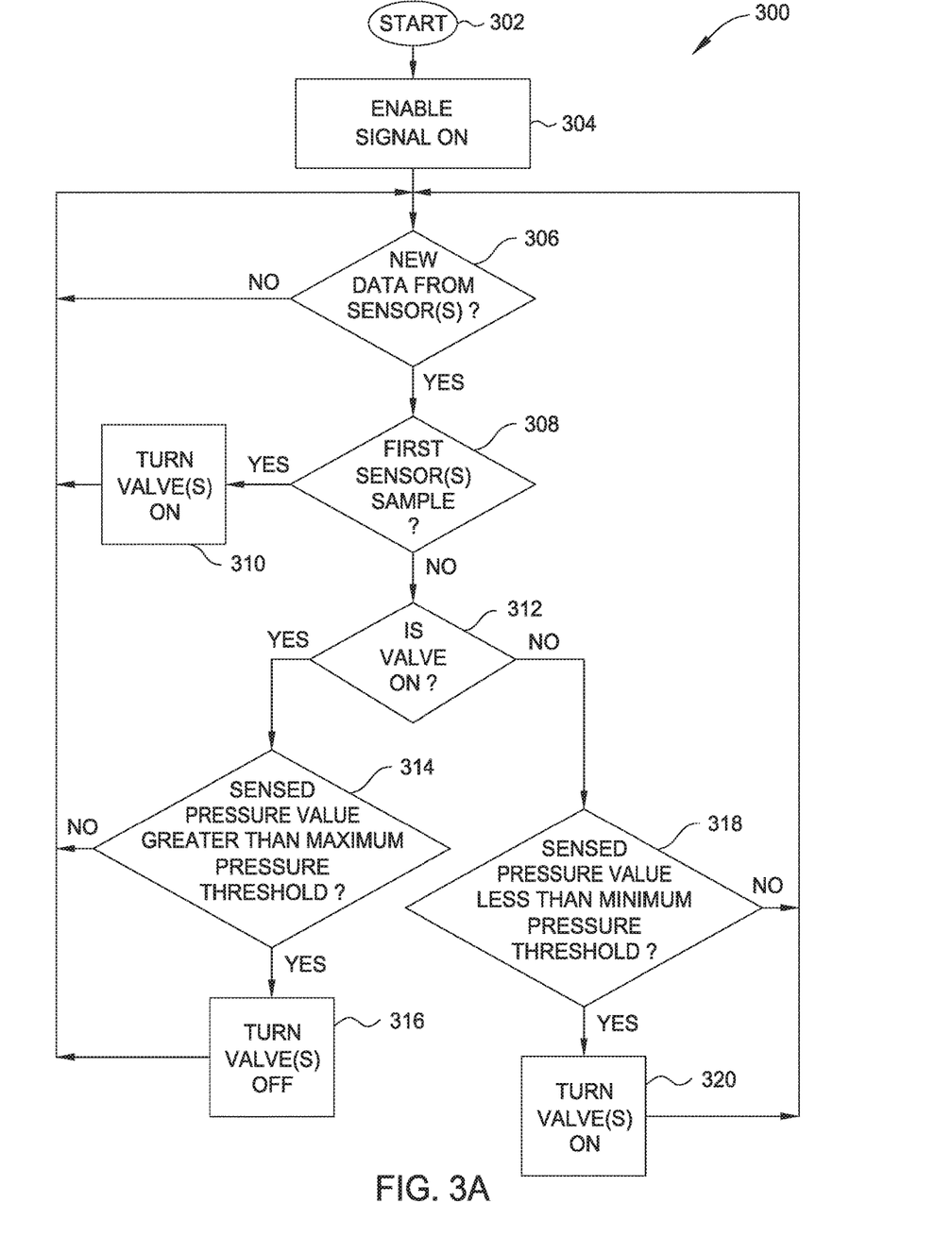
FIG. 3A is a block diagram of a method for controlling all of the valves shown in FIG. 2 simultaneously.

FIG. 3A illustrates a method 300 that a valve controller, such as valve controller 220, can implement to control valves, such as valves 206, simultaneously. In block 302, the method 300 can start. The method can move to block 304 when an enable signal is received. As discussed above with reference to FIG. 1, in various aspects, the valve controller could control valves between a pressurization tank and a propellant tank for the engine(s) of a crew escape module. In that case, an FMC onboard a main rocket could send the enable command upon detecting a failure of the main rocket. In various aspects, the enable signal may be sent to the valve controller by a command center or the like that initiates ignition of the engine(s) of the main rocket. In various aspects, the valve controller could be a stand-alone unit for testing control of valves between a pressurization tank and a propellant tank. In that case, the enable signal could be provided by a switch, button, or the like on the unit.

In block 306, the method 300 checks to see if new data has been received from the sensors. In various instances, the processor in the valve controller (e.g., processor 224) could sample the pressure sensors (e.g., pressure sensor(s) 208) every millisecond. If new data from the sensor(s) is not available, then the method 300 loops back to block 306 again. If new data is available, then, in block 308, the method 300 determines whether the sensor data is data from the first sensor sample after the enable signal was received in block 304. If the sensor data is the first sensor sample, then, in block 310, the valve controller can turn on (i.e., open) the valves. By turning the valves on, the method 300 can ensure that the propellant tank is pressurized or is pressurizing without delay. After block 310, the method 300 can return to block 306 to receive new sensor data (e.g., second sensor data, third sensor data, etc.). Since this new sensor data is not the first sensor sample, at block 308, the method moves to block 312. In block 312, the method 300 determines whether the valves are turned on. If the valves are turned on, then in block 314, the method 300 determines whether the pressure data from the sensors indicates a pressure that is higher than the pressure indicated by the maximum pressure threshold signal. If the indicated pressure is not higher than the maximum pressure threshold, then the method 300 returns to block 306 to receive the next sensor data. If the indicated pressure is higher than the maximum pressure threshold, then, in block 316, the method 300 turns (i.e., closes) the valves off and then returns to block 306 to receive the next sensor data. Referring again to block 312, if the method 300 determines that the valves are turned off, then in block 318, the method 300 determines whether the pressure data from the sensors indicates a pressure that is lower than the pressure indicated by the minimum pressure threshold signal. If the indicated pressure is not lower than the minimum pressure threshold, then the method 300 returns to block 306 to receive the next sensor data. If the indicated pressure is lower than the minimum pressure threshold, then, in block 320, the method 300 turns the valves on and then returns to block 306 to receive the next sensor data.

Figure 3B:
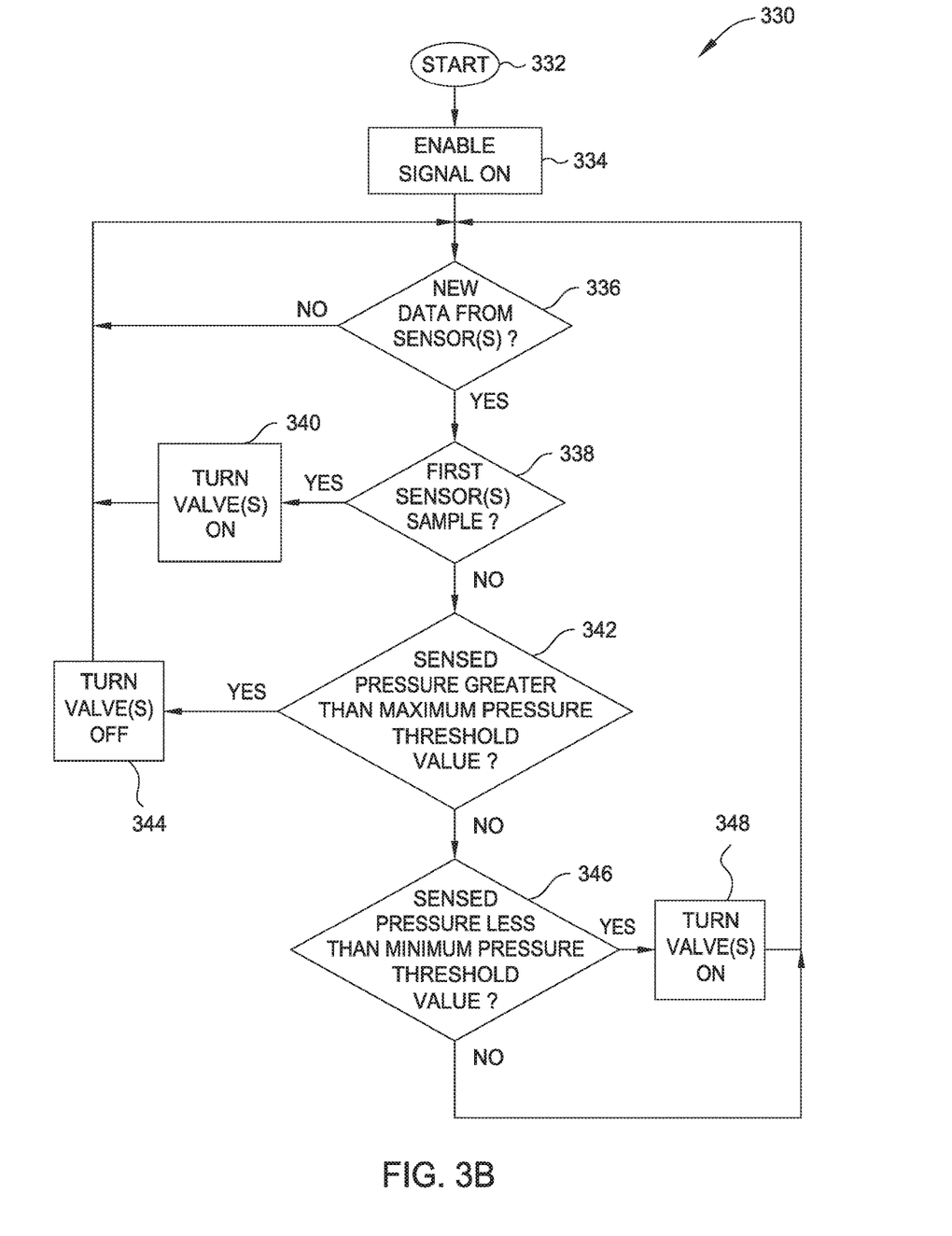
FIG. 3B is a block diagram of a method for controlling the valves shown in FIG. 2 in a sequential manner.

FIG. 3B illustrates a method 330 that a valve controller, such as valve controller 220, can implement to control valves, such as valves 206, individually or in combinations. In block 332, the method 330 can start. The method can move to block 334 when an enable signal is received. As discussed above with reference to FIG. 1, in various aspects, the valve controller could control valves between a pressurization tank and a propellant tank for the engine(s) of a crew escape module. In that case, an FMC onboard a main rocket could send the enable command upon detecting a failure of the main rocket. In various aspects, the enable signal may be sent to the valve controller by a command center or the like that initiates ignition of the engine(s) of the main rocket. In various aspects, the valve controller could be a stand-alone unit for testing control of valves between a pressurization tank and a propellant tank. In that case, the enable signal could be provided by a switch, button, or the like on the unit.

In block 336, the method 330 checks to see if new data has been received from the sensors. In various instances, the processor in the valve controller (e.g., processor 224) could sample the pressure sensors (e.g., pressure sensor(s) 208) every millisecond. If new data from the sensor(s) is not available, then the method 330 loops back to block 336 again. If new data is available, then, in block 338, the method 330 determines whether the sensor data is data from the first sensor sample after the enable signal was received in block 334. If the sensor data is the first sensor sample, then, in block 340, the valve controller can turn on (i.e., open) one or more of the valves. By turning on one or more of the valves, the method 330 can ensure that the propellant tank is pressurized or is pressurizing without delay. After block 340, the method 330 can return to block 336 to receive new sensor data (e.g., second sensor data, third sensor data, etc.). Since this new sensor data is not the first sensor sample, at block 338, the method moves to block 342. In block 342, the method 330 determines whether the pressure data from the sensors indicates a pressure that is higher than the pressure indicated by the maximum pressure threshold signal. If the indicated pressure is higher than the maximum pressure threshold, then, in block 344, the method 330 turns off (i.e., closes) at least one valve and then returns to block 336 to receive the next sensor data. In various aspects, the method 330 may turn off one valve per iteration at block 344. For example, referring to FIG. 2, suppose that in a first iteration, all four valves 206a, 206b, 206c, and 206d are on. If the method 330 determines that the indicated pressure is higher than the maximum pressure threshold in block 342, then the method 330 may turn off valve 206d in block 344. The method then returns to block 336 for the next iteration. If the method 330 determines that the indicated pressure is still higher than the maximum pressure threshold in block 342, then the method 330 may turn off valve 206c (so that valves 206c and 206d are turned off) in block 344. The method then returns to block 336 for the next iteration. If the method 330 determines that the indicated pressure is still higher than the maximum pressure threshold in block 342, then the method 330 may turn off valve 206b (so that valves 206b, 206c, and 206d are turned off) in block 344. The method then returns to block 336 for the next iteration. If the method 330 determines that the indicated pressure is still higher than the maximum pressure threshold in block 342, then the method 330 may turn off valve 206a (so that all valves 206a, 206b, 206c, and 206d are turned off) in block 340. In various embodiments, the method 330 may turn off multiple valves per iteration of the method. For example, the method 330 may turn off valves 206a and 206b during a first iteration of block 344 and turn off valves 206c and 206d (so that all valves are turned off) during a second iteration of block 344. If the indicated pressure is not higher than the maximum pressure threshold, then the method 330 moves to block 346 to receive the next sensor data.

In block 346, the method 330 determines whether the pressure data from the sensors indicates a pressure that is lower than the pressure indicated by the minimum pressure threshold signal. If the indicated pressure is not lower than the minimum pressure threshold, then the method 330 returns to block 336 to receive the next sensor data. If the indicated pressure is lower than the minimum pressure threshold, then, in block 348, the method 330 turns on at least one valve and then returns to block 306 to receive the next sensor data. In various aspects, the method 330 may turn on all valves at block 348. In various aspects, the method 330 may turn on one valve per iteration at block 348. For example, referring to FIG. 2, suppose that in a first iteration, all four valves 206a, 206b, 206c, and 206d are off. If the method 330 determines that the indicated pressure is lower than the minimum pressure threshold in block 346, then the method 330 may turn on valve 206d in block 348. The method then returns to block 336 for the next iteration. If the method 330 determines that the indicated pressure is still lower than the minimum pressure threshold in block 346, then the method 330 may turn on valve 206c (so that valves 206c and 206d are turned on) in block 348. The method then returns to block 336 for the next iteration. If the method 330 determines that the indicated pressure is still lower than the minimum pressure threshold in block 346, then the method 330 may turn on valve 206b (so that valves 206b, 206c, and 206d are turned on) in block 348. The method then returns to block 336 for the next iteration. If the method 330 determines that the indicated pressure is still lower than the minimum pressure threshold in block 346, then the method 330 may turn on valve 206a (so that all valves 206a, 206b, 206c, and 206d are turned on) in block 348. In various embodiments, the method 330 may turn on multiple valves per iteration of the method. For example, the method 330 may turn on valves 206a and 206b during a first iteration of block 348 and turn on valves 206c and 206d (so that all valves are turned on) during a second iteration of block 348.

Figures 4A, 4B, 4C:
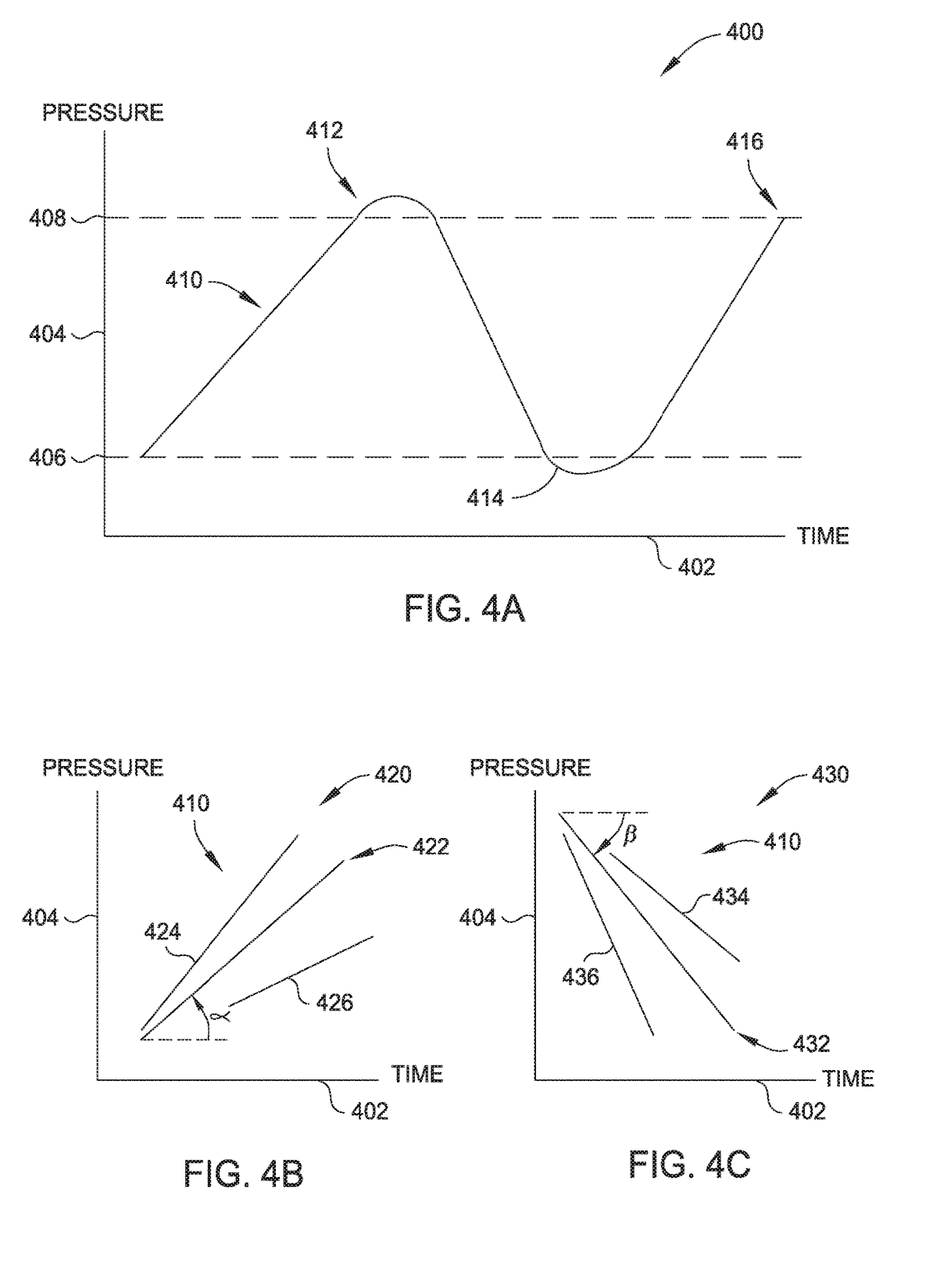
FIG. 4A is a diagram of pressure in the propellant tank of FIG. 2 according to control of the valves in accordance with the method shown in FIG. 3.
FIG. 4B is a diagram of rate of pressure increase in the propellant tank of FIG. 2 according to control of the valves in accordance with a method according to various aspects.
FIG. 4C is a diagram of rate of pressure decrease in the propellant tank of FIG. 2 according to control of the valves in accordance with a method according to various aspects.

FIG. 4A illustrates a graphical representation 400 of pressure variations in a pressure vessel (e.g., the propellant tank 202) wherein pressurization is being controlled by valves (e.g., the valves 206), and the valves are being controlled by a valve controller (e.g., the valve controller 220) according to various aspects. The graphical representation depicts pressure on a vertical axis 404 and time on a horizontal axis 402. The vertical axis 404 is intersected by a maximum pressure threshold value 408 and a minimum pressure threshold value 406. A line 410 shows sensed pressure (e.g., by the pressure sensor(s) 208) over time during some time interval during which the valve controller is operating. As the sensed pressure 410 increases and reaches the maximum pressure threshold value at point 412, one or more of the valves can be turned off. As indicated, the sensed pressure 410 may continue to rise above the maximum pressure threshold value 408 before beginning to decrease (e.g., as propellant is drained from the propellant tank 202). This pressure overshoot can be caused by a delay in the valves closing, air from the pressure source (e.g., pressure tank 204) moving through pipes or ducts, or other factors. In various aspects, this pressure overshoot can be characterized for a particular system and the maximum pressure threshold value at which the valves are turned off can be set below a targeted maximum pressure threshold value. For example, for the propellant tank 202, pressure tank 204, and valves 206 shown in FIG. 2, in various instances, the pressure in the propellant tank 202 may rise an additional 1 psi after the valves are turned off. If the targeted maximum pressure threshold value is 50 psi, then the maximum pressure threshold value 408 may be set at 49 psi so that the valves 206 close at 49 psi. After the valves are turned off, the sensed pressure 410 begins to decrease and eventually reaches the minimum pressure threshold value at point 414. When the minimum pressure threshold value 414 is reached at point 414, the valve controller can open one or more valves. As indicated, the sensed pressure 410 may continue to decrease below the minimum pressure threshold value 406 before beginning to increase. The pressure undershoot can be caused by a delay in the valves opening, a time delay for air to move from the valves through pipes and in to the pressure vessel, or other factors. In various aspects, this pressure undershoot can be characterized for a particular system and the minimum pressure threshold value at which the valves are turned on can be set above a targeted minimum pressure threshold value. For example, for the propellant tank 202, pressure tank 204, and valves 206 shown in FIG. 2, in various instances, the pressure in the propellant tank 202 may drop an additional 1 psi after the valves are turned off. If the targeted minimum pressure threshold value is 45 psi, then the minimum pressure threshold value 406 may be set at 46 psi so that the valves 206 turn on at 46 psi.

FIGS. 4B and 4C are graphical representations of rate of pressure change in a pressure vessel over time. In various aspects, the processor 224 of the valve controller could calculate a rate of pressure change by subtracting subsequent sensed pressure measurements from the sensors 208, calculating a difference between the subsequent measurements, and dividing the difference by the elapsed time between the subsequent measurements. FIG. 4B is a graphical representation 420 of a rate of pressure increase in a pressure vessel, wherein the graph includes pressure on the vertical axis 404 and time on the horizontal axis 402. In the graphical representation 420, the sensed pressure 410 is increasing over time at a particular rate, as indicated by line 422 that has an angle α relative to the horizontal axis 402. In various aspects, a particular rate of pressure increase may be desirable. For illustration, suppose that the line 422 represents the desired rate of pressure increase. If the rate of pressure increase is greater than the desired rate (e.g., as represented by line 424, then the valve controller could turn off at least one of the valves. For example, referring again to FIG. 2, if all four valves 206a, 206b, 206c and 206d are turned on and the pressure in the propellant tank 202 is increasing at the rate indicated by line 424, then at least one of the valves can be turned off to reduce the rate of pressure increase. For example, valve 206a could be turned off. If the next sensor sample(s) indicate that the rate of pressure increase is still higher than the desired rate, then a second valve could be turned off to further reduce the rate of pressure increase. For example, valve 206b could be turned off. If the next sensor sample(s) indicate that the rate of pressure increase is still higher than the desired rate, then a third valve could be turned off to further reduce the rate of pressure increase. For example, valve 206c could be turned off. If the next sensor sample(s) indicate that the rate of pressure increase is still higher than the desired rate, then a fourth valve could be turned off to further reduce the rate of pressure increase. For example, valve 206d could be turned off. Conversely, if the rate of pressure increase is less than the desired rate (e.g., as represented by line 426), then the valve controller could turn on at least one of the valves. For example, referring again to FIG. 2, if only one valve (e.g., valve 206a) is turned on and the pressure in the propellant tank 202 is increasing at the rate indicated by line 426, then at least one additional valve could be turned on to increase the rate of pressure increase. For example, valve 206b could be turned on. If the next sensor sample(s) indicate that the rate of pressure increase is still less than the desired rate, then a third valve could be turned on to further increase the rate of pressure increase. For example, valve 206c could be turned on. If the next sensor sample(s) indicate that the rate of pressure increase is still less than the desired rate, then a fourth valve could be turned on to further increase the rate of pressure increase. For example, valve 206d could be turned on.

FIG. 4C is a graphical representation 430 of a rate of pressure decrease in a pressure vessel, wherein the graph includes pressure on the vertical axis 404 and time on the horizontal axis 402. In the graphical representation 420, the sensed pressure 410 is decreasing over time at a particular rate, as indicated by line 432 that has an angle β relative to the horizontal axis 402. In various aspects, a particular rate of pressure decrease may be desirable. For illustration, suppose that the line 432 represents the desired rate of pressure decrease. If the rate of pressure decrease is greater than the desired rate (e.g., as represented by line 436, then the valve controller could turn on at least one of the valves. For example, referring again to FIG. 2, if all four valves 206a, 206b, 206c and 206d are turned off and the pressure in the propellant tank 202 is decreasing at the rate indicated by line 436, then at least one of the valves can be turned on to reduce the rate of pressure decrease. For example, valve 206a could be turned on. If the next sensor sample(s) indicate that the rate of pressure decrease is still higher than the desired rate, then a second valve could be turned on to further reduce the rate of pressure decrease. For example, valve 206b could be turned on. If the next sensor sample(s) indicate that the rate of pressure decrease is still higher than the desired rate, then a third valve could be turned on to further reduce the rate of pressure decrease. For example, valve 206c could be turned on. If the next sensor sample(s) indicate that the rate of pressure decrease is still higher than the desired rate, then a fourth valve could be turned on to further reduce the rate of pressure increase. For example, valve 206d could be turned on. Conversely, if the rate of pressure decrease is less than the desired rate (e.g., as represented by line 434, then the valve controller could turn off at least one of the valves. For example, referring again to FIG. 2, if all of the valves are turned on and the pressure in the propellant tank 202 is decreasing at the rate indicated by line 434, then at least one valve could be turned off to increase the rate of pressure decrease. For example, valve 206a could be turned off. If the next sensor sample(s) indicate that the rate of pressure decrease is still less than the desired rate, then a second valve could be turned off to further increase the rate of pressure decrease. For example, valve 206b could be turned off. If the next sensor sample(s) indicate that the rate of pressure decrease is still less than the desired rate, then a third valve could be turned on to further increase the rate of pressure decrease. For example, valve 206c could be turned off. If the next sensor sample(s) indicate that the rate of pressure decrease is still less than the desired rate, then a fourth valve could be turned on to further increase the rate of pressure decrease. For example, valve 206c could be turned off.

The descriptions of the various aspects have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

Aspects described herein may take the form of an entirely hardware aspect, an entirely software aspect (including firmware, resident software, micro-code, etc.) or an aspect combining software and hardware aspects that may all generally be referred to herein as a "circuit," "module" or "system."

The aspects described herein may be a system, a method, and/or a computer program product. The computer program product may include a computer readable storage medium (or media) having computer readable program instructions thereon for causing a processor to carry out aspects disclosed herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations according to various aspects may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects described herein.

Aspects are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to various aspects, other and further aspects may be devised without departing from the basic scope thereof, and the scope thereof is determined by the claims that follow.

What is claimed is:

1. A method for regulating pressure in a pressure vessel connected to a pressure source by a plurality of valves, the method comprising:
receiving a maximum pressure threshold value;
receiving a minimum pressure threshold value;
receiving, from a pressure sensor, a pressure signal indicating a pressure in the pressure vessel;
upon a value of the pressure signal dropping below the minimum pressure threshold value, opening at least one valve of the plurality of valves; and
upon a value of the pressure signal rising above the maximum pressure threshold value, closing at least one valve of the plurality of valves.

2. The method of claim 1, further comprising:
receiving an engagement signal; and
opening at least one valve of the plurality of valves upon receiving the engagement signal.

3. The method of claim 1, wherein, after opening at least one valve of the plurality of valves, upon the pressure signal indicating that the pressure in the pressure vessel remains below the minimum pressure threshold value, opening at least a second valve of the plurality of valves.

4. The method of claim 3, wherein, after opening at least a second valve of the plurality of valves, upon the pressure signal indicating that the pressure in the pressure vessel remains below the minimum pressure threshold value, opening at least a third valve of the plurality of valves.

5. The method of claim 4, wherein, after opening at least a third valve of the plurality of valves, upon the pressure signal indicating that the pressure in the pressure vessel remains below the minimum pressure threshold value, opening at least a fourth valve of the plurality of valves.

6. The method of claim 1, wherein, after closing at least one valve of the plurality of valves, upon the pressure signal indicating that the pressure in the pressure vessel remains above the maximum pressure threshold value, closing at least a second valve of the plurality of valves.

7. The method of claim 6, wherein, after closing at least a second valve of the plurality of valves, upon the pressure signal indicating that the pressure in the pressure vessel remains above the maximum pressure threshold value, closing at least a third valve of the plurality of valves.

8. The method of claim 7, wherein, after closing at least a third valve of the plurality of valves, upon the pressure signal indicating that the pressure in the pressure vessel remains above the maximum pressure threshold value, closing at least a fourth valve of the plurality of valves.

9. A non-transitory computer-readable storage medium containing computer-readable program code that, when executed by operation of one or more computer processors, performs an operation comprising:
receiving a maximum pressure threshold value;
receiving a minimum pressure threshold value;
receiving a pressure signal indicating a pressure in the pressure vessel;
upon a value of the pressure signal dropping below the minimum pressure threshold value, opening at least one valve of the plurality of valves; and
upon a value of the pressure signal rising above the maximum pressure threshold value, closing at least one valve of the plurality of valves.

10. The non-transitory computer-readable storage medium of claim 9, wherein the computer-readable program code performs further operations comprising:
receiving an engagement signal; and
opening at least one valve of the plurality of valves upon receiving the engagement signal.

11. The non-transitory computer-readable storage medium of claim 9, wherein, after opening at least one valve of the plurality of valves, upon the pressure signal indicating that the pressure in the pressure vessel remains below the minimum pressure threshold value, opening at least a second valve of the plurality of valves.

12. The non-transitory computer-readable storage medium of claim 11, wherein, after opening at least a second valve of the plurality of valves, upon the pressure signal indicating that the pressure in the pressure vessel remains below the minimum pressure threshold value, opening at least a third valve of the plurality of valves.

13. The non-transitory computer-readable storage medium of claim 12, wherein, after opening at least a third valve of the plurality of valves, upon the pressure signal indicating that the pressure in the pressure vessel remains below the minimum pressure threshold value, opening at least a fourth valve of the plurality of valves.

14. The non-transitory computer-readable storage medium of claim 9, wherein, after closing at least one valve of the plurality of valves, upon the pressure signal indicating that the pressure in the pressure vessel remains above the maximum pressure threshold value, closing at least a second valve of the plurality of valves.

15. The non-transitory computer-readable storage medium of claim 14, wherein, after closing at least a second valve of the plurality of valves, upon the pressure signal indicating that the pressure in the pressure vessel remains above the maximum pressure threshold value, closing at least a third valve of the plurality of valves.

16. The non-transitory computer-readable storage medium of claim 15, wherein, after closing at least a third valve of the plurality of valves, upon the pressure signal indicating that the pressure in the pressure vessel remains above the maximum pressure threshold value, closing at least a fourth valve of the plurality of valves.

* * * * *